United States Patent [19]

Sordello

[11] Patent Number: 5,421,362

[45] Date of Patent: Jun. 6, 1995

[54] SYSTEM OF PLUMBING FOR AN OVER-THE-ROAD VEHICLE

[75] Inventor: David L. Sordello, East Boston, Mass.

[73] Assignee: Watts Investment Company, Wilmington, Del.

[21] Appl. No.: 305,091

[22] Filed: Sep. 13, 1994

[51] Int. Cl.⁶ .................... A01M 7/00; F16K 49/00
[52] U.S. Cl. .................... 137/351; 137/563; 137/569; 137/899; 137/334
[58] Field of Search .............. 137/569, 899, 351, 563, 137/334, 341, 337

[56] References Cited

U.S. PATENT DOCUMENTS

| | | | |
|---|---|---|---|
| 1,377,256 | 5/1921 | LaBour | 137/569 |
| 2,638,924 | 5/1953 | St. Clair | 137/569 |
| 3,776,261 | 12/1973 | Houghton | 137/351 |
| 3,870,228 | 3/1975 | Moseley, Jr. | 137/563 |
| 4,491,150 | 1/1985 | Holman et al. | 137/565 |
| 5,351,337 | 9/1994 | Deutsch | 137/563 |

Primary Examiner—A. Michael Chambers
Attorney, Agent, or Firm—Fish & Richardson

[57] ABSTRACT

The invention provides an improved system of plumbing for over-the-road, domestic vehicles. The system includes a compact, unitary water distribution manifold for distributing water from an external supply of water. The manifold defines a system of conduits having inlets and outlets for connecting the conduits alternatively to a pressurized external water supply, or, where the external supply is not pressurized, to a pump, with a bypass valve for controlling the flow of water to the pump inlet. The system of plumbing further includes drain valves coupled to a cold water conduit and to a hot water conduit for draining water from the manifold and connected piping, e.g. for cold weather storage.

5 Claims, 4 Drawing Sheets

SYSTEM OF PLUMBING FOR AN OVER-THE-ROAD VEHICLE

BACKGROUND OF THE INVENTION

The invention relates to plumbing systems for over-the-road vehicles.

Over-the-road domestic vehicles, such as motor homes, travel trailers and the like, are typically equipped with a system of plumbing for distribution of water from an external source to different locations within the vehicle, e.g. kitchen, washroom, etc. The system of plumbing in more comfortable vehicles will often include a heater for delivery of hot water. In many instances, the plumbing system is adapted for connection to an external source of water supply under pressure, e.g., as available in most camping areas. The plumbing system will also generally include an auxiliary pump for generating pressure for delivery of water throughout the system in cases where the external source is not pressurized, e.g. water supplied from a tank, well or, more remotely, from a natural stream or pond. Since an over-the-road vehicle is often stored in an unheated area during the off season, the plumbing system most typically will include means for draining the pipes, as required in colder climates to avoid damage to the system, e.g. due to freezing.

SUMMARY OF THE INVENTION

The invention provides an improved system of plumbing for over-the-road, domestic vehicles, the system including a compact, unitary manifold structure for distributing water from an external supply of water. The manifold defines a system of conduits having inlets and outlets for connecting the conduits to a pressurized external water supply, or, where the external supply is not pressurized, for connecting the conduits to a pump, with a bypass valve for controlling the flow of water to the pump inlet. The system of plumbing further includes drain valves coupled to a cold water conduit and to a hot water conduit for draining water from the manifold and connected piping, e.g. for cold weather storage.

The improved plumbing system of the invention thus provides the operator of a motor home arriving at a campsite and requiring running water (e.g., for drinking, washing, or toilet facilities), the ability to simply hook up the external supply of water (typically with a hose) to the water distribution manifold. When the system of plumbing, including the water distribution manifold, is required to be drained, for example, when the motor home is winterized, the drain valves connected to each of the cold and hot water conduits are opened to clear the water from the system.

Moreover, the unitary design of the system of plumbing of the invention, with the water distribution manifold, significantly reduces the number of piping joints and connected lengths of piping that are typical in conventional, prior art plumbing systems used in over-the-road domestic vehicles.

According to the invention, a system of plumbing for an over-the-road domestic vehicle, and a vehicle equipped with such a system of plumbing, has an inlet for connection to a pressurized or non-pressurized source of water and one or more outlets for consumption of water within the vehicle. The system of plumbing of the invention comprises a water distribution manifold defining a system of conduits for flow of water therethrough, a pump mounted adjacent the water distribution manifold and defining a pump inlet and a pump outlet, the pump, upon actuation, adapted to deliver water received at the pump inlet from the pump outlet under pressure, a first conduit defined by the water distribution manifold and defining an inlet for connection to the pressurized or non-pressurized source of water, the first conduit further defining a heater outlet for flow of water from the first conduit toward a water heater, at least one utility outlet for flow of water from the first conduit for consumption within the vehicle, and a first drain port for flow of water from the system of plumbing, and the first conduit having a first end connected to the pump inlet and a second end connected to the pump outlet, a bypass valve disposed in the first conduit between the first end and the outlets, the bypass valve, in a first, open position, indicated when the source of water is under pressure, allowing flow of water in the first conduit from the inlet toward the outlets of the first conduit, thereby bypassing the pump, and the bypass valve in a second, closed position, indicated when the source of water is not under pressure, allowing flow of water in the first conduit from the inlet toward the pump inlet, and, upon actuation, through the pump, a first drain valve disposed in the first conduit at the first drain port and having a first, closed position and a second, open position, the first drain port positioned to allow water to fully drain from the first conduit, a second conduit defined by the water distribution manifold and defining an inlet for receiving flow of water from a hot water heater, the second conduit further defining at least one utility outlet for flow of water from the second conduit for consumption within the vehicle, and a second drain port for flow of water from the system of plumbing, and a second drain valve disposed in the second conduit at the second drain port and having a first, closed position and a second, open position, the second drain port positioned to allow water to fully drain from the second conduit.

Preferred embodiments of the invention may include one or more of the following features. The first and second drain valves have actuation handles positioned for easy access from external of the vehicle. The vehicle may have an external, removable access port for exposing the actuation handles.

Other features and advantages of the invention will become apparent from the following detailed description of a presently preferred embodiment, and from the claims.

DESCRIPTION OF THE PREFERRED EMBODIMENTS

Figure 1:
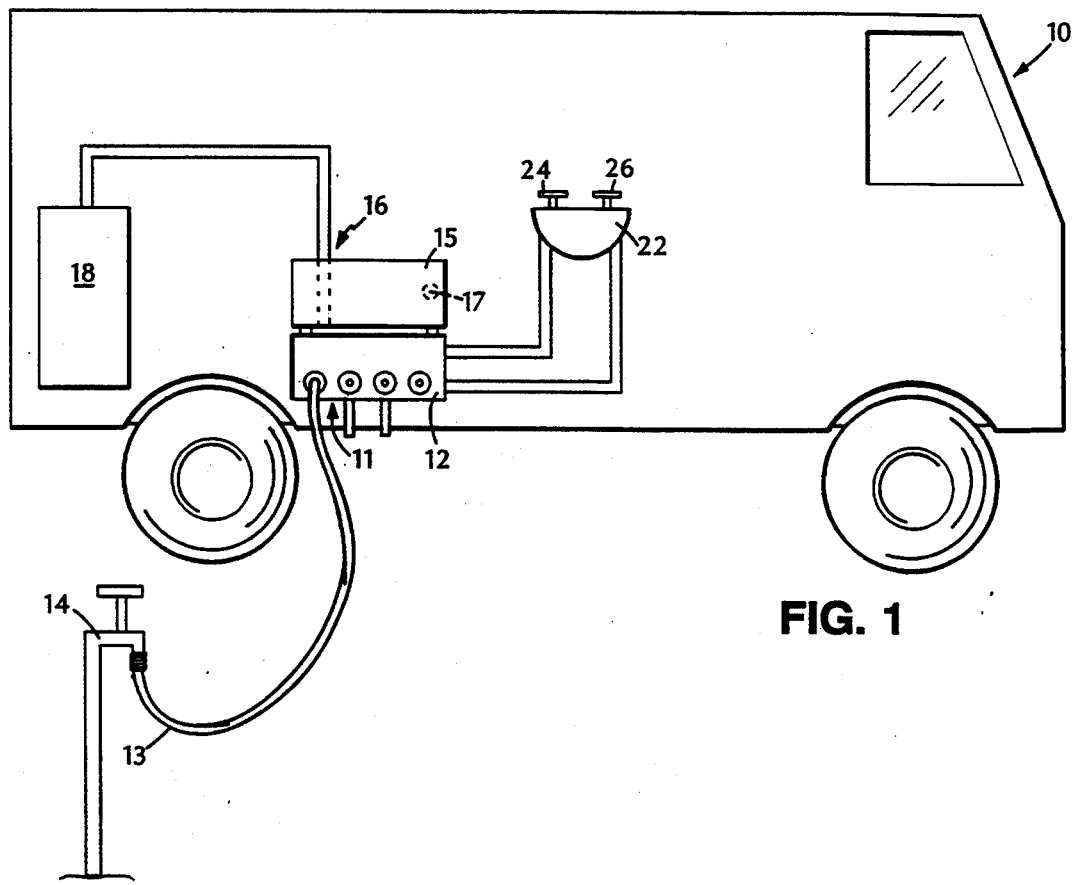
FIG. 1 is a diagrammatic view of a motor home vehicle having a system of plumbing, including a water distribution manifold, of the invention.

Referring to FIG. 1, an over-the-road domestic vehicle 10 (e.g., motor home) has a system of plumbing 11, including a compact, unitary water distribution manifold 12. The system of plumbing 11 is located along the lower portion of the body of vehicle 10 for receiving water through a hose 13 from an external supply 14 and distributing the water to various parts of plumbing 16 within vehicle 10. The water from external supply 14 is typically unheated and supplied from a pressurized system, although other sources for providing water to motor home 10 may not be pressurized, for example, tank supply or pond. As will be described in greater detail below, for circumstances where the water is supplied from a non-pressurized source, the system of plumbing 11 includes a pump circulation of the water through the plumbing system conduits. A hinged door 15 attached to vehicle 10 provides access to the water distribution manifold 12, and includes a locking mechanism 17 to limit access to inlets, outlets and valves.

The typical motor home 10 also includes a combination hot water heater/storage tank 18 connected to the system of plumbing 11 which receives cold water from the water distribution manifold 12 and provides the heated water back to the water distribution manifold for distribution to other parts of motor home 10, such as to a wash basin 22 in a kitchen or bathroom. Wash basin 22 includes cold and hot water faucets 24, 26 to deliver unheated and heated water, respectively, from water distribution manifold 12 through piping 28.

Figure 2:
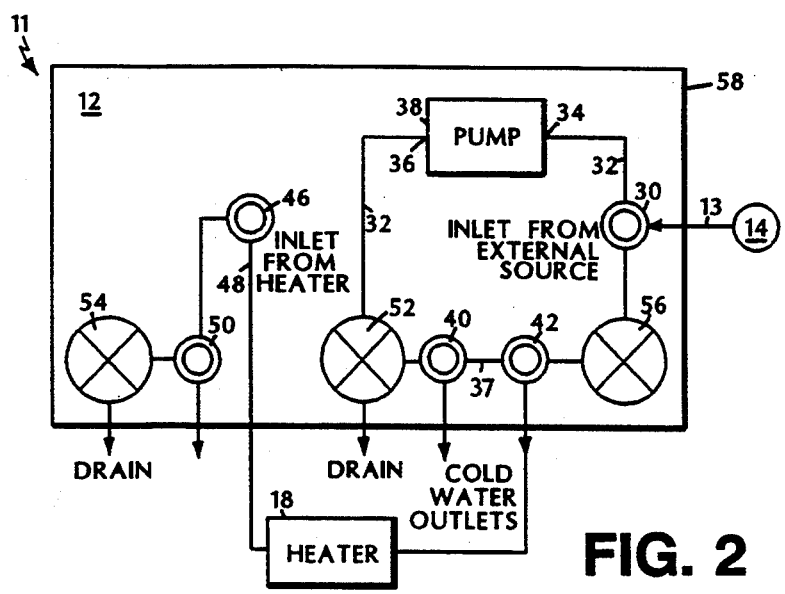
FIG. 2 is a schematic representation of the system of plumbing, including a water distribution manifold, of the invention.

Referring to the schematic representation of the system of plumbing 11 shown in FIG. 2, water distribution manifold 12 defines a conduit 32 with an inlet 30 for receiving unheated water from external water supply 14 into water distribution manifold 12. Conduit 32 extends between inlet and outlet ports 34, 36 of pump 38. The water distribution manifold 12 further defines conduit 37, with an outlet 40 providing cold water to piping 40 leading to a cold water faucet 24 (FIG. 1) and an outlet 42 providing water to heater/storage unit 18. The cold water exiting via outlet 42 is returned as heated water to water distribution manifold 12 at an inlet 46, which feeds a heated water conduit 48. The heated water can then be provided back to the piping of the motor home 10 through an outlet 50, e.g., to hot water faucet 26 at wash basin 22 (FIG. 1).

Drain valves 52, 54 are also coupled to conduits 32, 48, respectively, to permit water to be drained from the system of plumbing, including water distribution manifold 12, and from the vehicle piping, e.g., when the motor home is winterized.

Figure 3:
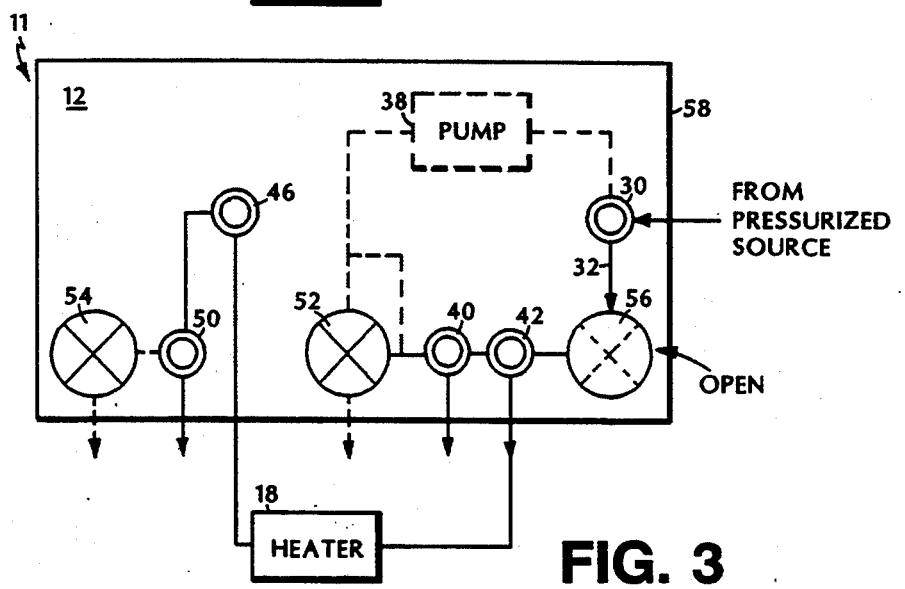
FIGS. 3 and 4 are schematic representations of the system of plumbing of the invention, respectively showing its operation from a pressurized water source and from a non-pressurized water source.
Figure 4:
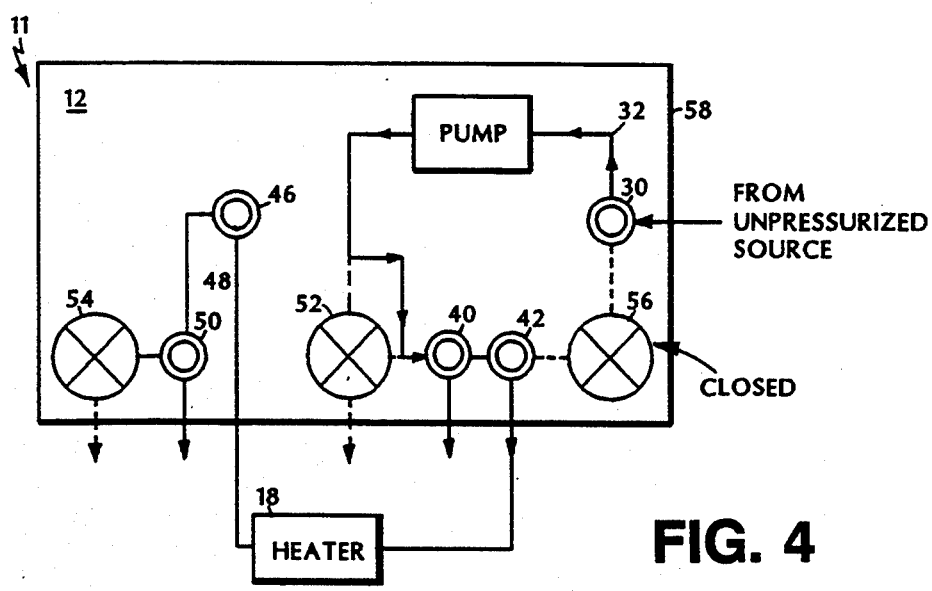

Referring to FIG. 3, a bypass valve 56 is coupled to conduit 32 at a position between inlet 30 and outlets 40, 42. Bypass valve 56 is opened when water from external supply 14 is pressurized to allow the water to flow directly from inlet 30 to outlets 40, 42, bypassing pump 38. Alternatively, referring to FIG. 4, if the external supply is not pressurized, bypass valve 56 is closed to cause the water from inlet 30 to flow to pump 38. (For clarity, unused portions of the plumbing system 11 are shown in dashed line in FIGS. 3 and 4.)

Figure 5:
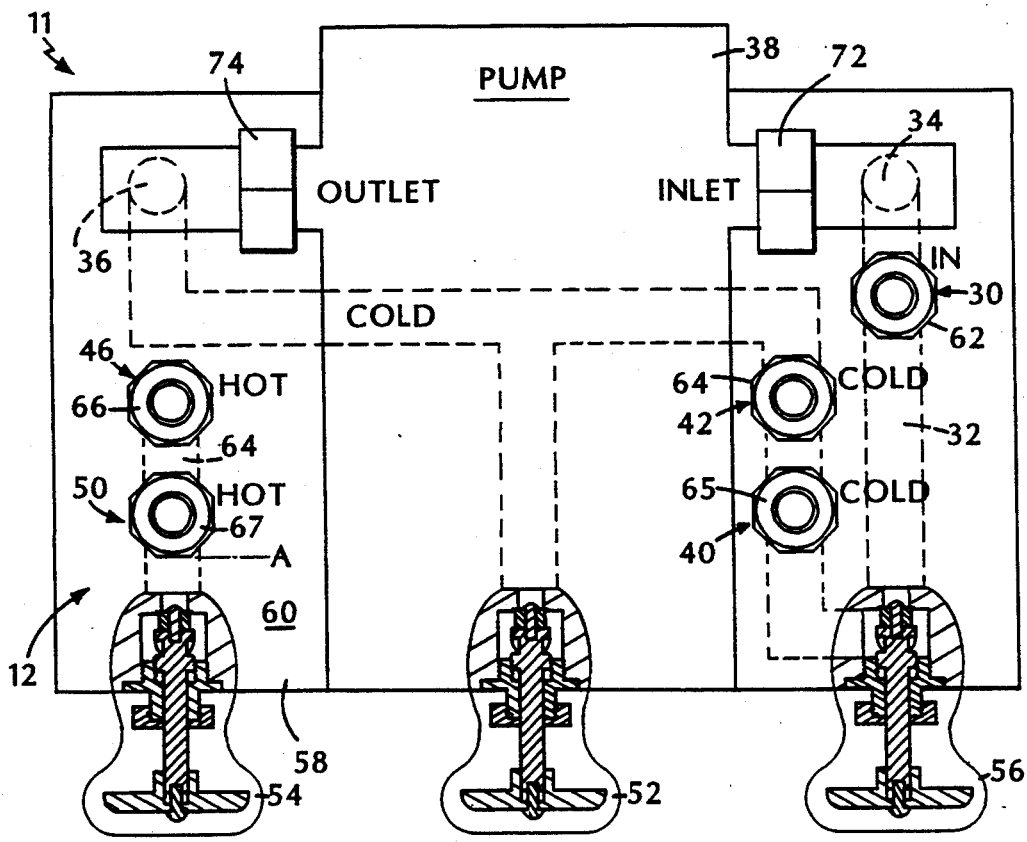
FIG. 5 is a top view, partially in cross-section, of the system of plumbing of the invention.
Figure 6:
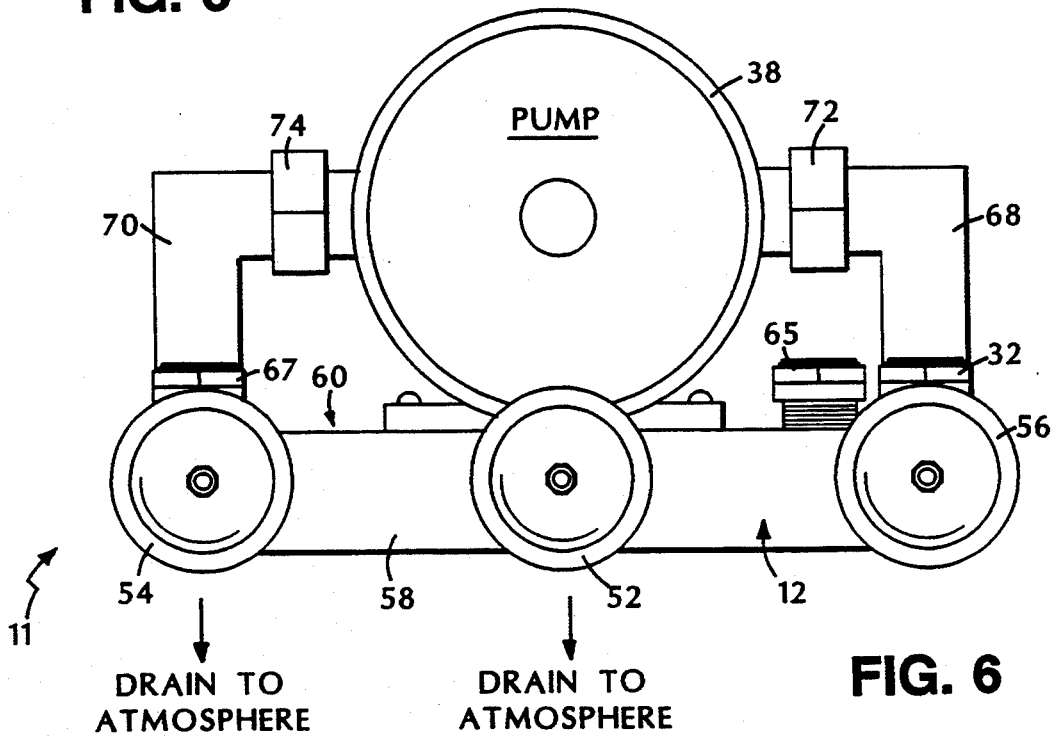
FIG. 6 is a side view of the system of plumbing of FIG. 5.

Referring to FIGS. 5 and 6, the water distribution manifold 12 is a channelized housing 58, preferably an aluminum casting. Alternatively, housing 58 may be machined as separate halves of an assembly that are brazed or otherwise secured together. Housing 58 is relatively compact, e.g. less than about 10 inches long by 8 inches in diameter, with a top surface 60 of sufficient size for supporting pump 38. A threaded coupling 62 is provided at inlet 30 for coupling a hose 13 leading to external water source 14. Threaded couplings 64, 65, 66, and 67 are similarly provided at outlets 40, 42, as well as hot water inlet and outlet 46, 50, respectively, each coupling extending from surface 60 of housing 58. Elbow joints 68, 70 extend from water distribution manifold 58 to mate with threaded couplings 72, 74 at the inlet and outlet, respectively, of pump 38.

Drain valves 52, 54 and bypass valve 56, e.g. screwdown stop valves, are easily accessible behind hinged lockable door 15 of vehicle 10 (FIG. 1), which covers the water distribution manifold 12.

Figure 7:
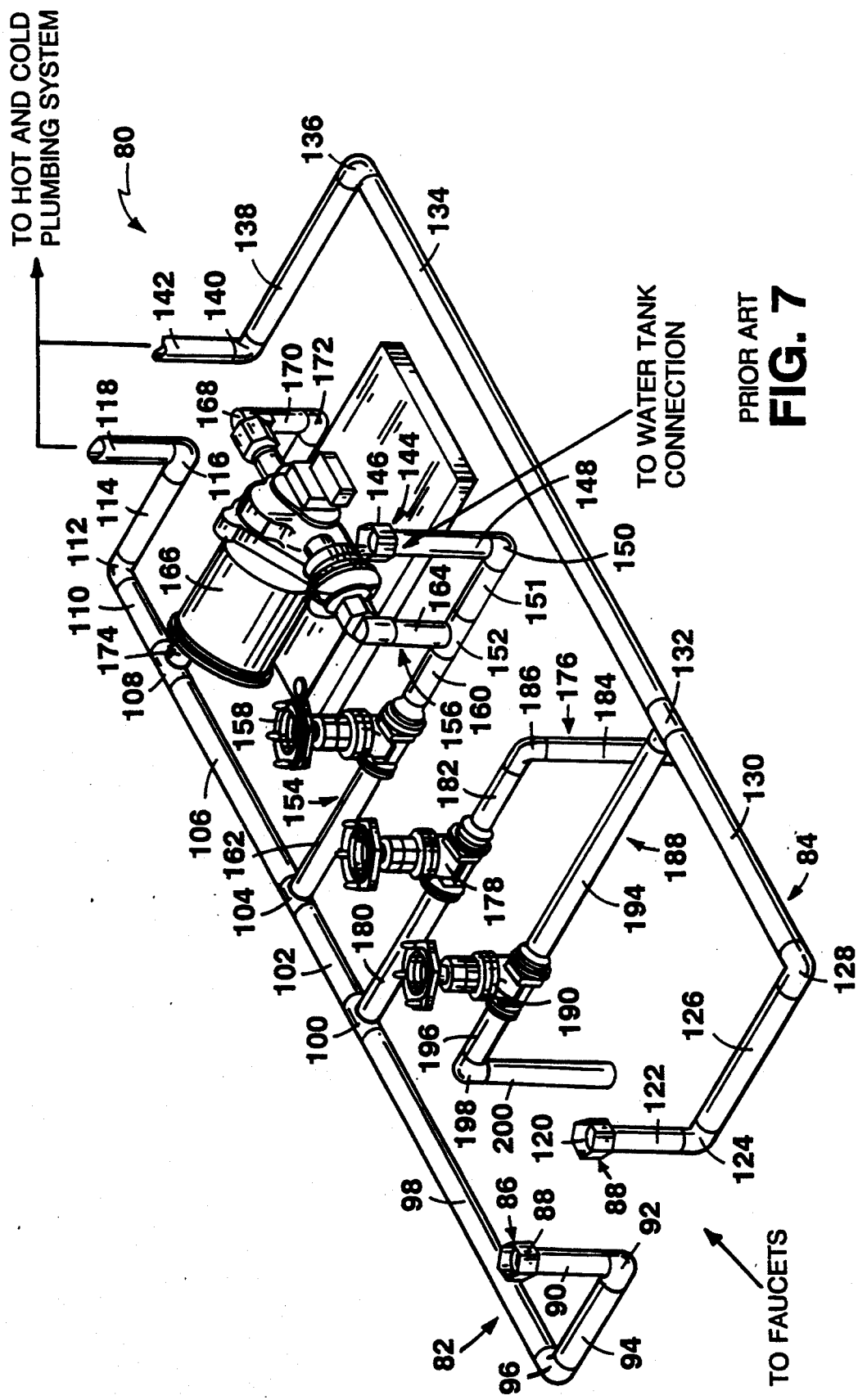
FIG. 7 is a diagrammatic view of a conventional, prior art plumbing system for a motor home vehicle.

For better appreciation of the simplicity and practicality of the system of plumbing 11, including the unitary water distribution manifold 12, an example of a conventional, prior art plumbing system for a motor home vehicle is shown in FIG. 7. As is apparent from FIG. 7, the conventional, prior art plumbing system includes a substantial number of plumbing fixtures (e.g. T-joints and elbow joints) and piping of various lengths.

Conventional, prior art plumbing system 80 includes a cold water conduit 82 and a hot water conduit 84, each having ends connected between faucet outlets 86, 88, respectively, and a hot water heater and storage tank (not shown). Beginning at cold water faucet 86, cold water conduit 82 includes, in succession, a threaded coupling 88, piping 90, elbow joint 92, piping 94, elbow joint 96, piping 98, T-joint 100, piping 102, T-joint 104, piping 106, T-joint 108, piping 110, elbow joint 112, piping 114, elbow joint 116 and piping 118, which terminates at an inlet port of the heater. Similarly, starting at hot water faucet outlet 88, hot water conduit 84 includes, in succession, a threaded coupling 120, piping 122, elbow joint 124, piping 126, elbow joint 128, piping 130, T-joint 132, piping 134, elbow joint 136, piping 138, elbow joint 140 and piping 142, which leads to the outlet port of the heater.

Cold water from an external supply is introduced to plumbing system 80 at an inlet 144 having a threaded coupling 146 connected to piping 148 that extends to a T-joint 152 through an elbow joint 150 and piping 151. The T-joint 152 has branches 154, 156 which both connect to cold water conduit 82, depending on whether the external supply is pressurized or non-pressurized. Branch 154 includes a bypass valve 158, which is connected to T-joint 152 through piping 160. The bypass valve 158, in the open position, allows pressurized water to flow through bypass valve 158 and piping 162 connected to water conduit 82 at T-joint 104. If, on the other hand, the external supply of water is non-pressurized, bypass valve 152 is closed, and the water is forced to flow through branch 156. Branch 156 includes piping 164 connected to the inlet of a pump 166 and, from the outlet of pump 166, in succession, an elbow joint 168, piping 170, elbow joint 172 and piping 174 which connects to cold water conduit 82 at T-joint 108.

Cold water conduit 82, and the plumbing to which it is connected to, can be drained through drain branch 176 which includes a drain valve 178 connected to cold water conduit 82 at T-joint 100 through piping 180. When drain valve 178 is opened, water is allowed to drain through the valve and piping 182, 184 connected by an elbow joint 186.

Similarly, hot water conduit 84, and the plumbing to which it is connected to, is drained through a drain branch 188 having a drain valve 190 connected to hot water conduit 84 at T-joint 132 through piping 194. Opening drain valve 190 allows water from hot water conduit 84 to drain through piping 196, elbow joint 198 and drain piping 200.

Other embodiments are within the following claims. For example, it is appreciated that where reference has been made to connections to piping, flexible tubing may alternatively be used.

What is claimed is:

1. A system of plumbing for an over-the-road domestic vehicle, with an inlet for connection to a pressurized or non-pressurized source of water and one or more outlets for consumption of water within the vehicle, said system of plumbing comprising:
    a water distribution manifold defining a system of conduits for flow of water therethrough,
    a pump mounted adjacent said water distribution manifold and defining a pump inlet and a pump outlet, said pump, upon actuation, adapted to deliver water received at said pump inlet from said pump outlet under pressure,
    a first conduit defined by said water distribution manifold and defining an inlet for connection to the pressurized or non-pressurized source of water,
        said first conduit further defining a heater outlet for flow of water from said first conduit toward a water heater, at least one utility outlet for flow of water from said first conduit for consumption within the vehicle, and a first drain port for flow of water from said system of plumbing, and
        said first conduit having a first end connected to said pump inlet and a second end connected to said pump outlet,
    a bypass valve disposed in said first conduit between said first end and said outlets, said bypass valve, in a first, open position, indicated when the source of water is under pressure, allowing flow of water in said first conduit from said inlet toward said outlets of said first conduit, thereby bypassing said pump, and said bypass valve in a second, closed position, indicated when the source of water is not under pressure, allowing flow of water in said first conduit from said inlet toward said pump inlet, and, upon actuation, through said pump,
    a first drain valve disposed in said first conduit at said first drain port and having a first, closed position and a second, open position, said first drain port positioned to allow water to fully drain from said first conduit,
    a second conduit defined by said water distribution manifold and defining an inlet for receiving flow of water from a hot water heater,
        said second conduit further defining at least one utility outlet for flow of water from said second conduit for consumption within the vehicle, and a second drain port for flow of water from said system of plumbing, and
    a second drain valve disposed in said second conduit at said second drain port and having a first, closed position and a second, open position, said second drain port positioned to allow water to fully drain from said second conduit.

2. The system of claim 1 wherein said first and second drain valves have actuation handles positioned for easy access from external of the vehicle.

3. A vehicle having a system of plumbing with an inlet for connection to a pressurized or non-pressurized source of water and one or more outlets for consumption of water within the vehicle, said system of plumbing comprising:
    a water distribution manifold defining a system of conduits for flow of water therethrough,
    a pump mounted adjacent said water distribution manifold and defining a pump inlet and a pump outlet, said pump, upon actuation, adapted to deliver water received at said pump inlet from said pump outlet under pressure,
    a first conduit defined by said water distribution manifold and defining an inlet for connection to the pressurized or non-pressurized source of water,
        said first conduit further defining a heater outlet for flow of water from said first conduit toward a water heater, at least one utility outlet for flow of water from said first conduit for consumption within the vehicle, and a first drain port for flow of water from said system of plumbing, and
        said first conduit having a first end connected to said pump inlet and a second end connected to said pump outlet,
    a by-pass valve disposed in said first conduit between said first end and said outlets, said bypass valve, in a first, open position, indicated when the source of water is under pressure, allowing flow of water in said first conduit from said inlet toward said outlets of said first conduit, thereby bypassing said pump, and said bypass valve in a second, closed position, indicated when the source of water is not under pressure, allowing flow of water in said first conduit from said inlet toward said pump inlet, and, upon actuation, through said pump,
    a first drain valve disposed in said first conduit at said first drain port and having a first, closed position and a second, open position, said first drain port positioned to allow water to drain from said first conduit,
    a second conduit defined by said water distribution manifold and defining an inlet for receiving flow of water from a hot water heater,
        said second conduit further defining at least one utility outlet for flow of water from said second conduit for consumption within the vehicle, and a second drain port for flow of water from said system of plumbing, and
    a second drain valve disposed in said second conduit at said second drain port and having a first, closed position and a second, open position, said second drain port positioned to allow water to fully drain from said second conduit.

4. The vehicle of claim 3 wherein said first and second drain valves have actuation handles positioned for easy access from external of the vehicle.

5. The vehicle of claim 4 further comprising an external removable access port for exposing said actuation handles.

* * * * *